Figure 1:
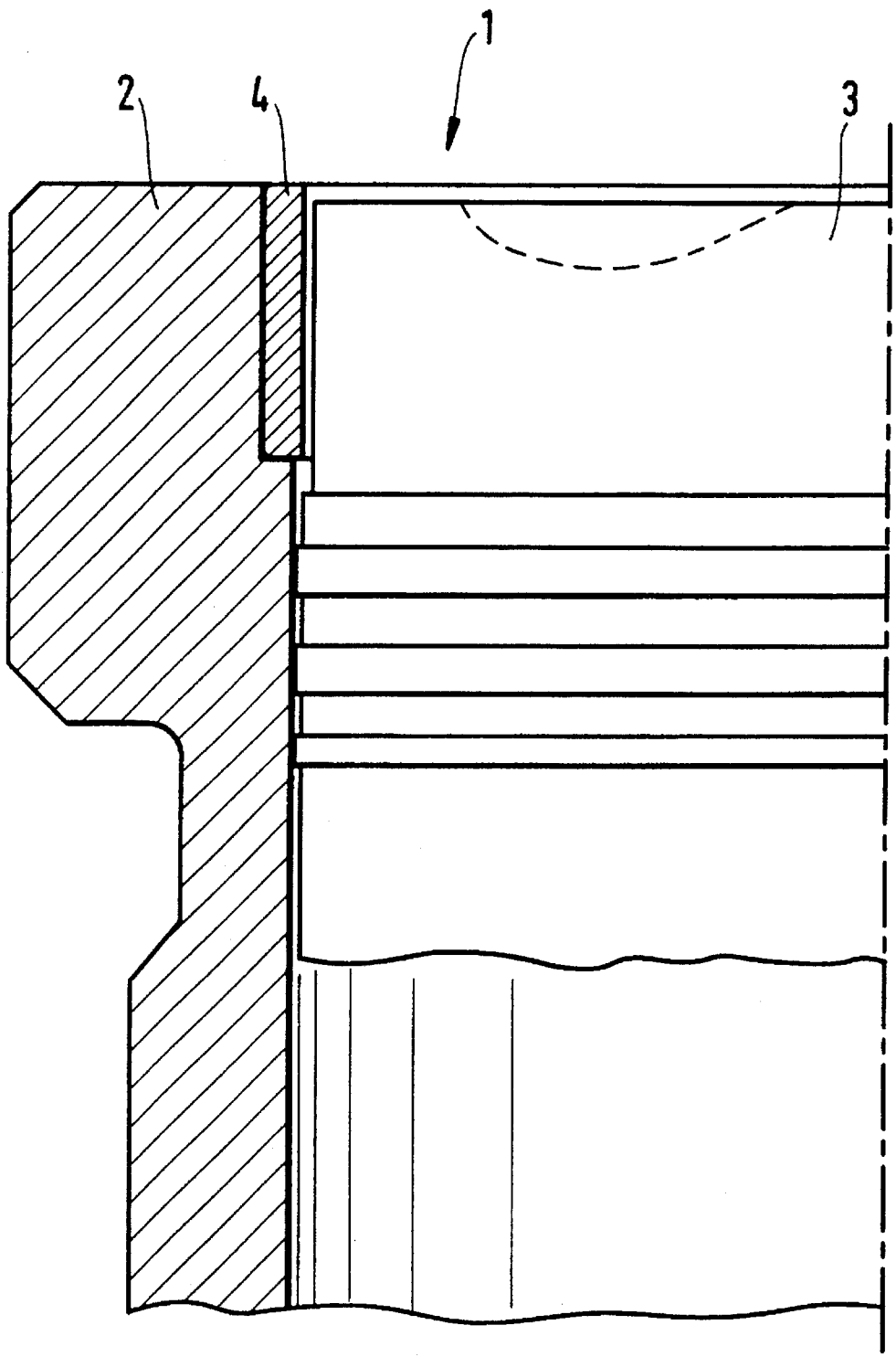

United States Patent [19]

Paro

[11] Patent Number: 5,553,585
[45] Date of Patent: Sep. 10, 1996

[54] ANTI-POLISHING RING

[75] Inventor: Daniel Paro, Kvevlax, Finland

[73] Assignee: Wartsila Diesel International Ltd OY, Helsinky, Finland

[21] Appl. No.: 441,934

[22] Filed: May 16, 1995

[30] Foreign Application Priority Data

May 27, 1994 [FI] Finland .................................. 942498

[51] Int. Cl.⁶ ......................................... F16J 1/04
[52] U.S. Cl. ........................... 123/193.2; 92/169.1
[58] Field of Search .................. 123/193.2; 277/24, 277/182, 195, 235 B; 92/169.1

[56] References Cited

U.S. PATENT DOCUMENTS

| | | | |
|---|---|---|---|
| 3,620,137 | 10/1969 | Prasse | 123/193.2 |
| 4,474,147 | 10/1984 | Hoopes | 123/193.4 |
| 4,770,133 | 9/1988 | Schibalsky | 123/193.2 |
| 5,058,488 | 10/1991 | Cullen et al. | 123/193.6 |
| 5,112,066 | 5/1992 | Remmerfelt | 277/235 B |

FOREIGN PATENT DOCUMENTS

| | | | |
|---|---|---|---|
| 3123080 | 8/1982 | Germany | 123/193.2 |
| 60-243349 | 12/1985 | Japan | 123/193.2 |
| 2-241952 | 9/1990 | Japan | 123/193.2 |
| 4-1453 | 1/1992 | Japan | 123/193.2 |

Primary Examiner—David A. Okonsky
Attorney, Agent, or Firm—Smith-Hill and Bedell

[57] ABSTRACT

An anti-polishing ring (4) to be used in a cylinder (1) of a large diesel engine, which is supported to a cylinder liner (2) for the purpose of removing possible carbon deposit and carbon residue from the upper portion of a piston (3). The anti-polishing ring (4) is provided with an arrangement, by means of which the lower edge (4b) of the anti-polishing ring can be pressed in the radial direction of the cylinder inwards towards the mantle surface of the upper portion of the piston so that the proportion between the diameters of the lower edge (4b) and the upper portion (4a) of the anti-polishing ring is at its minimum while the engine is running.

17 Claims, 5 Drawing Sheets

ANTI-POLISHING RING

The invention relates to an anti-polishing ring to be used in a cylinder of a large diesel engine, which is supported to a cylinder liner and the purpose of which is to remove possible carbon deposit and carbon residue from the upper portion of a piston.

In prior anti-polishing ring solutions the inner diameter of the ring is usually slightly smaller than the diameter of the cylinder. If the piston has to be removed out from the cylinder at the maintenance of the engine, also the anti-polishing ring has then be first removed, because otherwise there is not enough space for the piston to be taken out from the cylinder. This fact naturally makes maintenance operations of this kind slower and more difficult to accomplish.

An object of the invention is to create a new anti-polishing ring solution, by means of which i.a. the above-mentioned disadvantage in the known solutions can be eliminated.

In accordance with the invention by providing the anti-polishing ring with an arrangement, by means of which the lower edge of the anti-polishing ring can be pressed in the radial direction of the cylinder inwards towards the mantle surface of the upper portion of the piston so that the proportion between the diameters of the lower edge and the upper portion of the anti-polishing ring is at its minimum while the engine is running, the anti-polishing ring may be dimensioned so that its diameter is of the same size or almost of the same size as the cylinder liner when it is in the normal temperature, i.e. when the engine is not in use. Then the piston can be pulled past the anti-polishing ring out from the cylinder, which makes maintenance of the engine more uncomplicated.

According to an embodiment the anti-polishing ring is assembled of at least two parts of different material, the thermal expansion of which differ from each other substantially and which are located so that the part, the thermal expansion of which is greater, forms a ring-like element encircling the lower portion of the anti-polishing ring and pressing, in the running temperature of the engine, the lower portion of the anti-polishing ring towards the piston.

In practice the anti-polishing ring may then be made of so called invar metal alloy, whereby the said element may advantageously be of aluminium, steel or the like metal having a substantially high thermal expansion coefficient. For example the thermal expansion coefficient of aluminium is of its order of magnitude more than 20 times and of steel clearly more than 10 times higher than that of the invar alloy.

The said element may comprise also two or several separate layers arranged radially one inside the other. The element may also comprise several segments or bars, the longitudinal thermal expansion of which causes the desired press effect.

Said element may also comprise a hollow space, which may be filled with an expanding pressure medium, for instance by gas, liquid of melted metal.

In a further alternative embodiment the said arrangement includes means, for example a set of screws or the like, by means of which the lower edge of the anti-polishing ring can be pressed mechanically in the radial direction of the cylinder inwards towards the mantle surface of the piston. In this case the screws can be arranged to effect on the anti-polishing ring also through a half-viscose elastomer portion or through a plastic portion. In this embodiment the said supplementary portions are in practice segments, which together form a pressure portion encircling the anti-polishing ring.

According to a further alternative embodiment the anti-polishing ring comprises a set of pressure elements with hollow inner portion to be filled with a pressure medium and the pressure of which is adjustable by means of the said screws or the like. Specially suitable for the purpose are pressure mediums, which are heat-resistant, solidifying and keep well their volume in the operation temperatures of the engine. In practice the pressure medium may with advantage contain for example one or several silicone compounds, for instance silicone rubber and PDMS (polymethylsiloxane), and suitable filling material, for example glass fibre, carbon fibre or the like.

In the following, the invention will be described, by way of example, with reference to the enclosed drawing, in which FIG. 1 shows a prior art solution for an anti-polishing ring in section, FIGS. 2–6 show different embodiments of an anti-polishing ring according to the invention in section.

Figure 5:
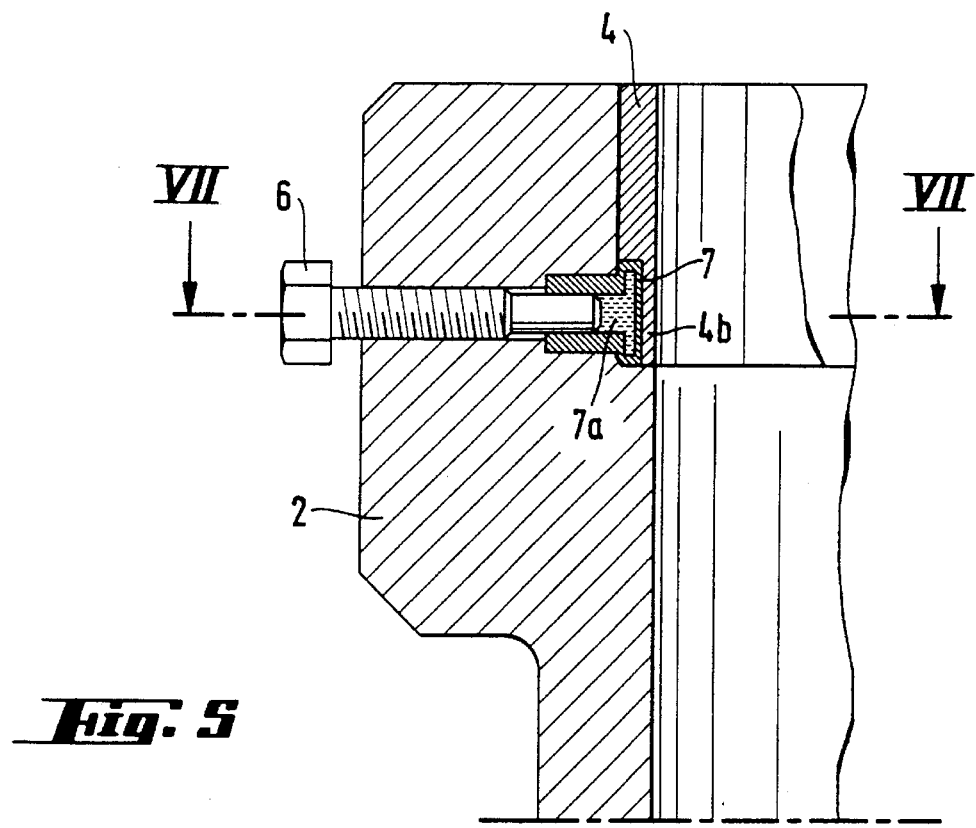
Figure 7:
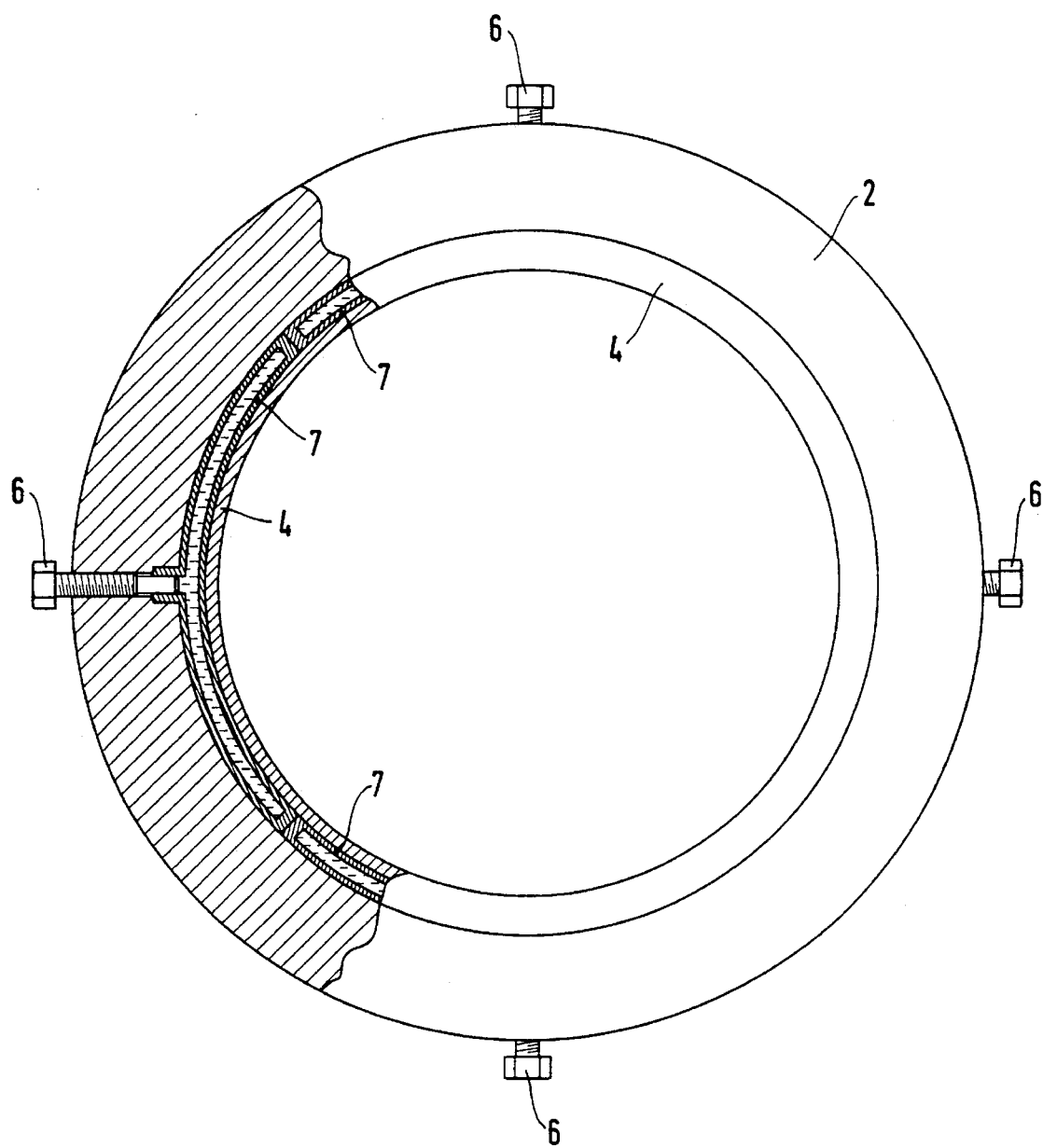

FIG. 7 is partial section VII—VII of FIG. 5.

In the drawing 1 indicates a cylinder of a large diesel engine, inside a cylinder liner 2 of which a piston 3 is arranged to move back and forth. The cylinder liner 2 is provided with an anti-polishing ring 4, which in the prior art solution of FIG. 1 forms a small step, the purpose of which is to remove carbon deposit and carbon residue possibly depositing at the upper portion of the piston during the operation of the engine. The upper portion of the piston 3, correspondingly, has a slightly smaller diameter. Therefore, the piston cannot be removed from the cylinder without first removing the anti-polishing ring 4.

FIGS. 2–6 show, correspondingly, different solutions according to the invention, in which the diameter of the upper portion 4a of the anti-polishing ring 4 nearly corresponds the inner diameter of the cylinder liner 2, but which comprise an arrangement, by means of which a lower edge 4b of the anti-polishing ring 4 may be pressed in the radial direction of the cylinder liner towards the mantle surface of the upper portion of the piston so that a desired effect for removal of carbon deposit and carbon coal is achieved.

Figure 2:
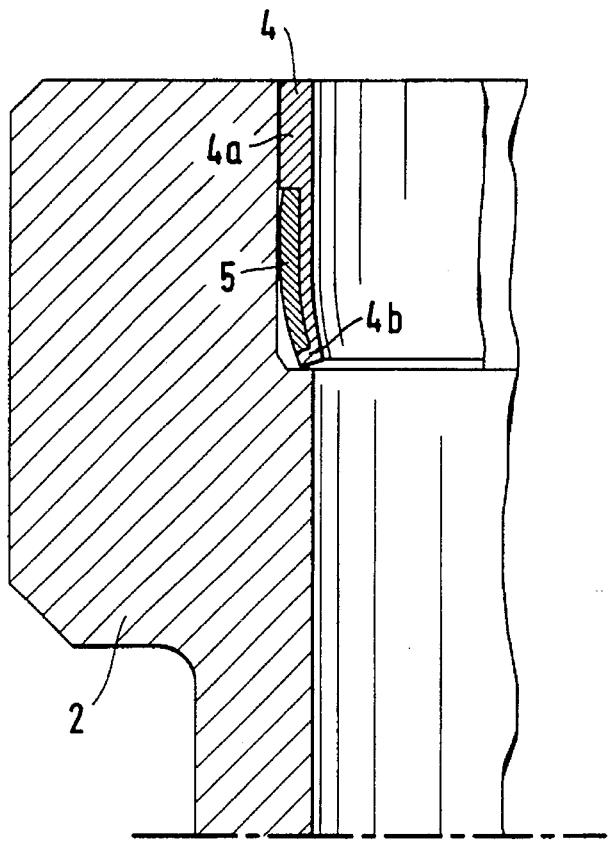

An arrangement according to FIG. 2 is based on a bimetal solution, in which to the lower portion of the anti-polishing ring is installed a ring-formed element 5 encircling it and the thermal expansion coefficient of which is substantially higher than of the actual anti-polishing ring 4. In this case in the operating temperature of the engine the thermal expansion of the element 5 causes the phenomenon shown in FIG. 2, according to which the lower portion 4b of the anti-polishing ring is pressed inwards towards the mantle surface of the upper portion of the piston. The element 5 may with advantage be a divided ring or may comprise a set of segments or bar-like members.

Figure 3:
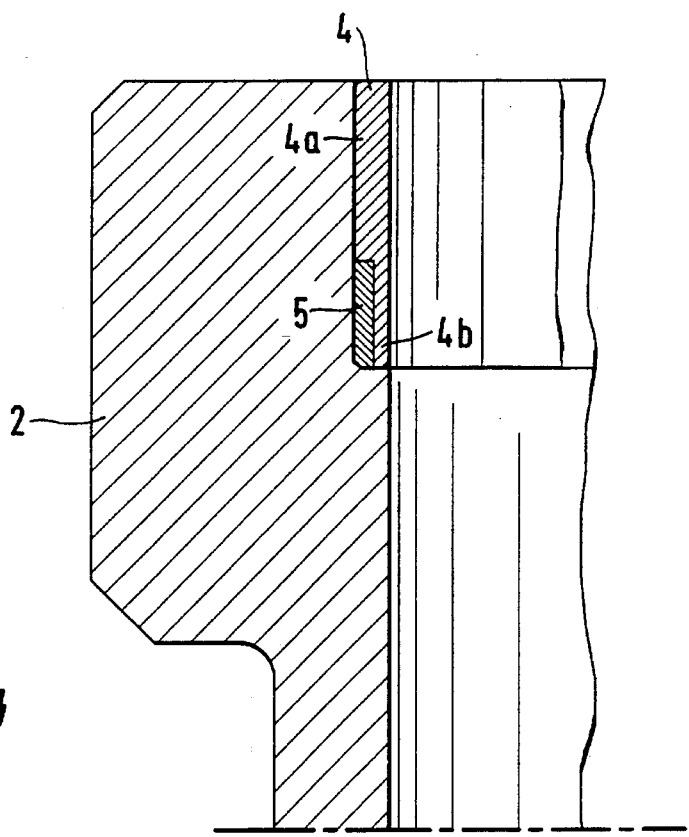

In the solution of FIG. 3 the element 5 comprises a uniform ring, the thermal expansion of which, correspondingly, causes the lower portion 4b of the anti-polishing ring to be pressed towards the piston when the engine is in use, whereby the temperature at the same time essentially rises. FIG. 3 shows the solution in normal temperature, whereby the engine, thus, is not in use. In this case the element 5 does not prevent pulling the piston out from the cylinder.

Figure 4:
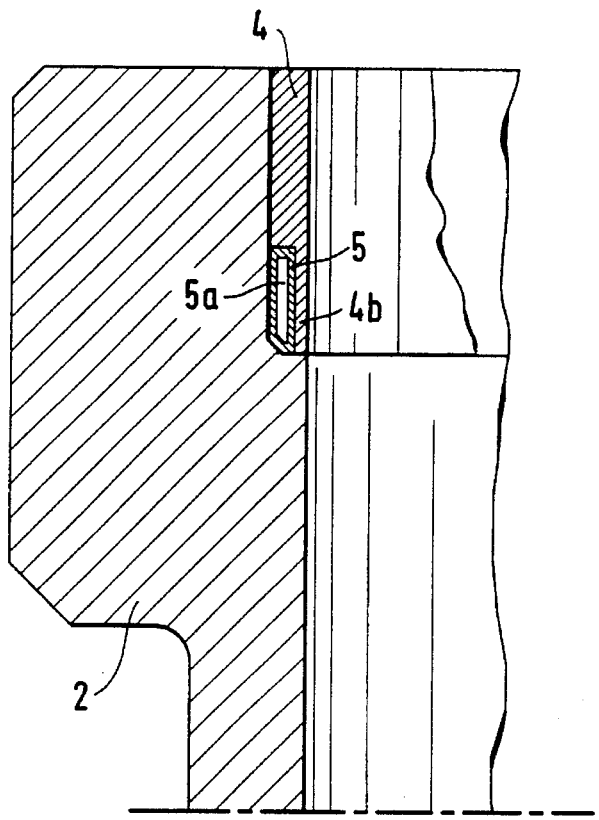

In the solution of FIG. 4 the element 5 comprises a hollow space 5a, which can be filled with some suitable pressure medium for achieving and further increasing the aforementioned pressing effect.

The solution of FIG. 5 for its part comprises a pressing element 7 with a hollow inner space 7a, which can be filled up with a pressure medium and communicating with outer space, whereby the pressure of the inner space 7a and, thus, the pressure effect to be provided can be controlled by means of a screw 6. The elements 7 may advantageously be segments each being provided with an adjusting screw 6 of its own. This is illustrated by FIG. 7, which is a partial section of FIG. 5 and where the pressing element 7 includes four separate segments.

Figure 6:
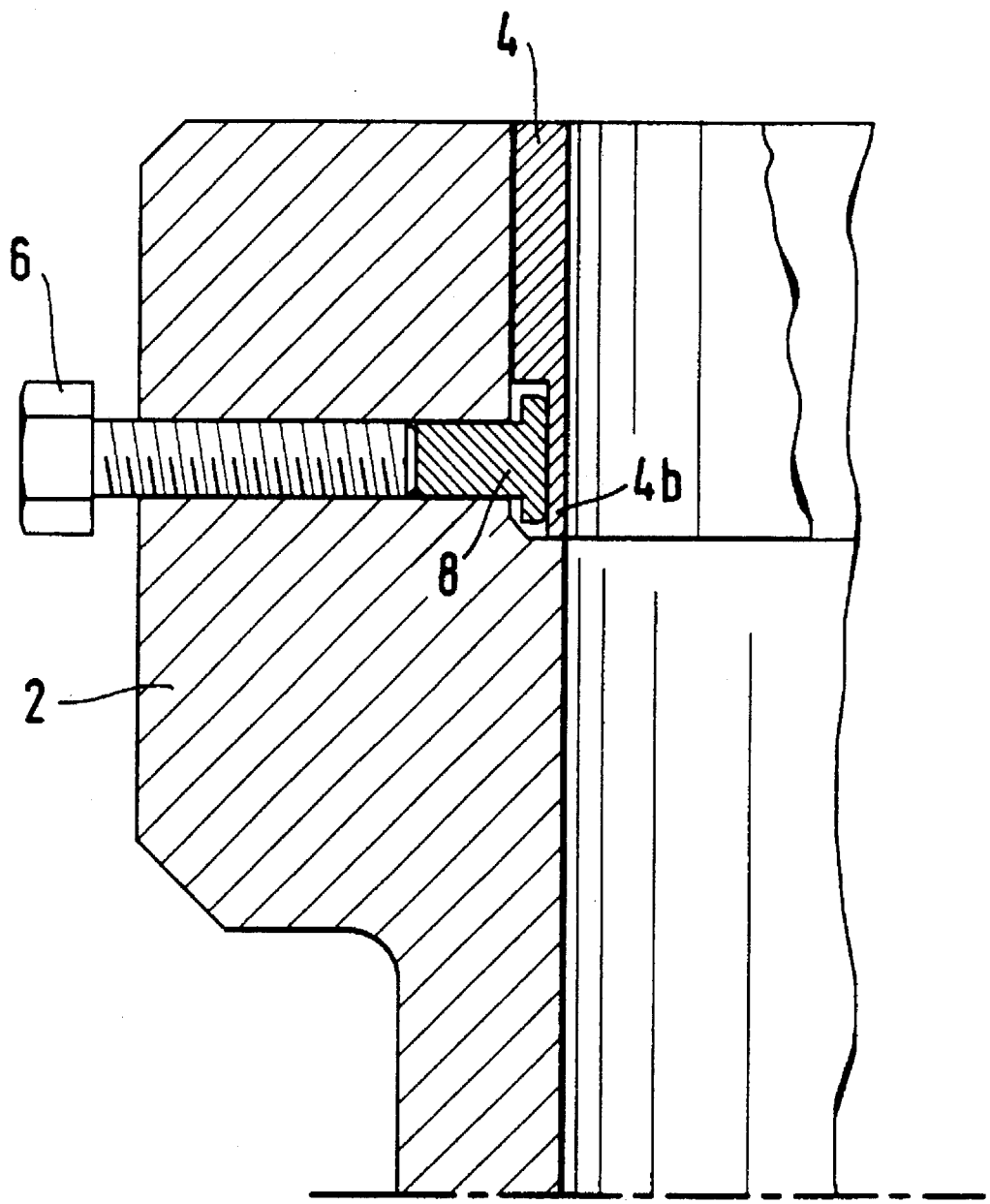

The solution of FIG. 6 comprises an element 8 mechanically pressable by means of the screw 6. Also in this case the elements 8 are advantageously segments.

The adjusting arrangements of FIGS. 5 and 6 are shown only as principle solutions, the practical implementations of which can be carried out in many different ways. In order to have the pressing effect under control on different sides of the piston, a sufficient amount of adjusting screws are needed together with some common control system.

Also the selections of materials and pressure mediums relating to the different solutions may be carried out, in addition to what has been said above, in different ways within the scope of conventional professional skills in the art.

The invention is, thus, not limited to the embodiments shown, but several modifications thereof are feasible within the scope of the attached claims.

I claim:

1. An anti-polishing ring to be used in a cylinder of a diesel engine that includes a cylinder liner and a piston fitted in the cylinder liner, the piston having an upper portion and the upper portion of the piston having a mantle surface, the anti-polishing ring being supported to the cylinder liner for the purpose of removing possible carbon deposit and carbon residue from the upper portion of the piston, wherein the anti-polishing ring has an upper portion and a lower edge and the lower edge of the anti-polishing ring is pressed radially inward of the cylinder toward the mantle surface of the upper portion of the piston.

2. An anti-polishing ring according to claim 1, wherein the anti-polishing ring has a lower portion that is assembled of an inner part and an outer part, the coefficient of thermal expansion of the outer part being substantially greater than that of the inner part such that at the running temperature of the engine, the lower edge of the anti-polishing ring is pressed radially inward of the cylinder toward the mantle surface of the upper portion of the piston due to differential thermal expansion.

3. An anti-polishing ring according to claim 2, wherein the inner part of the lower portion of the anti-polishing ring is made of invar and the outer part of the lower portion of the anti-polishing ring is made of a metal having a substantially higher coefficient of thermal expansion than invar.

4. An anti-polishing ring according to claim 3, wherein the outer part of the lower portion of the anti-polishing ring is made of aluminum or steel.

5. An anti-polishing ring according to claim 2, wherein the outer part of the lower portion of the anti-polishing ring forms a ring-like element encircling the inner part thereof.

6. An anti-polishing ring according to claim 2, wherein the outer part of the lower portion of the anti-polishing ring is composed of several segments that together form said ring-like element.

7. An anti-polishing ring according to claim 2, wherein the outer part of the lower portion of the anti-polishing ring is composed of several bars.

8. An anti-polishing ring according to claim 2, wherein the upper portion of the anti-polishing ring is made of the same material as the inner part of the lower portion of the anti-polishing ring.

9. An anti-polishing ring according to claim 8, wherein the upper portion of the anti-polishing ring and the inner part of the lower portion of the anti-polishing ring are made of invar and the outer part of the lower portion of the anti-polishing ring is made of a metal having a substantially higher coefficient of thermal expansion than invar.

10. An anti-polishing ring according to claim 9, wherein the outer part of the lower portion of the anti-polishing ring is made of aluminum or steel.

11. An anti-polishing ring according to claim 2, wherein the outer part of the lower portion of the anti-polishing ring is composed of at least two layers arranged radially one inside the other.

12. An anti-polishing ring according to claim 2, wherein the outer part of the lower portion of the anti-polishing ring defines a cavity that is filled with a pressure medium that expands with increase in temperature.

13. An anti-polishing ring according to claim 12, wherein said pressure medium is a gas, a liquid, or a molten metal.

14. An anti-polishing ring according to claim 1, comprising a mechanism by which the lower edge of the anti-polishing ring can be pressed mechanically radially inward of the cylinder toward the mantle surface of the upper portion of the piston.

15. An anti-polishing ring according to claim 14, wherein said mechanism comprises a plurality of screws in threaded engagement with the cylinder liner and each having an inner end in force transmitting relationship with the anti-polishing ring.

16. An anti-polishing ring according to claim 15, wherein the screws act on the anti-polishing ring through a half-viscose elastomer portion or through a plastic element.

17. An anti-polishing ring according to claim 14, comprising a plurality of hollow pressure elements filled with a pressure medium, and wherein the pressure of the pressure medium is adjustable by means of said mechanism.

* * * * *